Aug. 25, 1953     J. S. ROBBINS     2,650,083

COAL DRILL

Filed Dec. 29, 1950

INVENTOR:
JAMES S. ROBBINS
BY
ATT'YS

Patented Aug. 25, 1953

2,650,083

UNITED STATES PATENT OFFICE 2,650,083

COAL DRILL

James S. Robbins, Highland Park, Ill., assignor to Goodman Manufacturing Company, Chicago, Ill., a corporation of Illinois Application December 29, 1950, Serial No. 203,368

2 Claims. (Cl. 262—19)

This invention relates to rock drills, particularly such as are suitable for boring coal and other friable earths.

The main objects of this invention are to provide an improved form of rock boring device that works on the principle of first drilling a cylindrical hole and then breaking down the surrounding material by a wedging action; to provide an improved form of calyx drill which is capable of cutting a bore surrounded by a concentric kerf in the rock that is being drilled and then breaking down the core of rock that stands between such bore and kerf by a wedging action; and to provide in a drill of this type an improved form of body structure that serves as a core-bursting device as well as a spiral screw conveyor that effectively breaks down and removes the broken rock during a continuous advance of the drill under power.

This invention is in the nature of an improvement upon the rock drill described and claimed in my copending application Serial No. 153,335, filed April 1, 1950, now Patent No. 2,575,975.

A specific embodiment of this invention is shown in the accompanying drawings in which.

Figure 1:
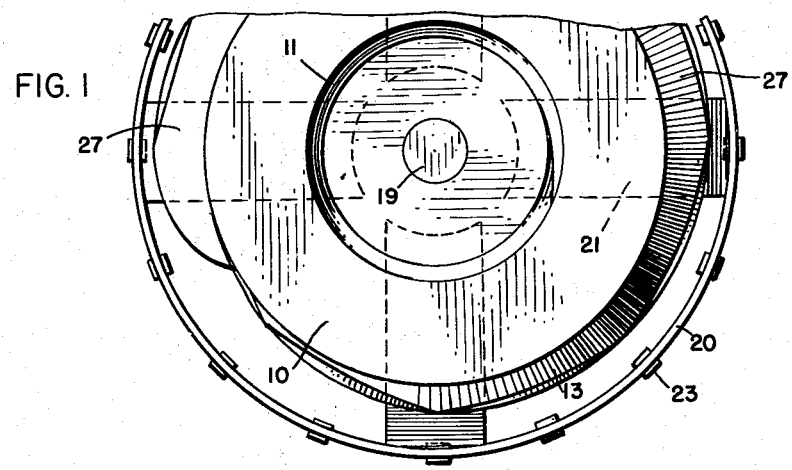
Figure 1 is a top view of the drill constructed according to this invention, being partly broken away.

In the form shown in the drawings, the device comprises a head 10 having a threaded bore 11 for attachment to a drill rod and having a depending downwardly tapered conical body portion 12 which has a spiral burster rib 13 projecting from its conical surface. The rib 13 is in the form of a spiral flange on the body portion 12 having its forward end of less diameter than that of the pilot bit 17 and having its upper or rearward surface arranged for conveying cuttings and fragments of rock upward or backward along the bore that is made by the drill. To this end its radial width increases with distance from the cutters. The rib 13 is roughly rectangular in radial cross section and has a broad external rim 14 conforming generally to the surface of a geometrical cone having its defining surface elements, represented by the line 15, disposed at an angle sufficient to perform the rock-bursting function hereinafter described. For this purpose an angle of about 20 degrees between the axis 16 of the drill and the elements 15 of the cone has been found to be appropriate. The width of the rim 14 is such that it presents a broad surface for lateral pressure against the side wall of the bore rather than cutting into such wall.

Axially alined with the body portion 12 of the drill head is a pilot bit 17 with cutters 18 at its lower end for cutting a bore of greater diameter than the advancing end of the burster rib 13 and having a cylindrical shank 19 keyed or otherwise secured fast in an axial bore in the body portion 12.

A cylindrical kerf cutting body 20 is mounted concentrically about the axis of the drill and attached to the body portion 12 by means of radial arms 21. The lower end of the cylindrical body 20 is shaped to form an annular series of teeth 22 terminating in cutters 23 arranged for cutting an annular kerf in the rock wall, as indicated at 24, which kerf is concentric with the bore, indicated at 25, that is made by the cutters of the pilot bit 17. The pilot bit cutters 18 are located to penetrate the rock in advance of the kerf cutters 23.

The drill shown is designed for operation under power so as to be driven at a definite speed of rotation with a definite rate of advance, depending upon the nature of the rock material.

Figure 2:
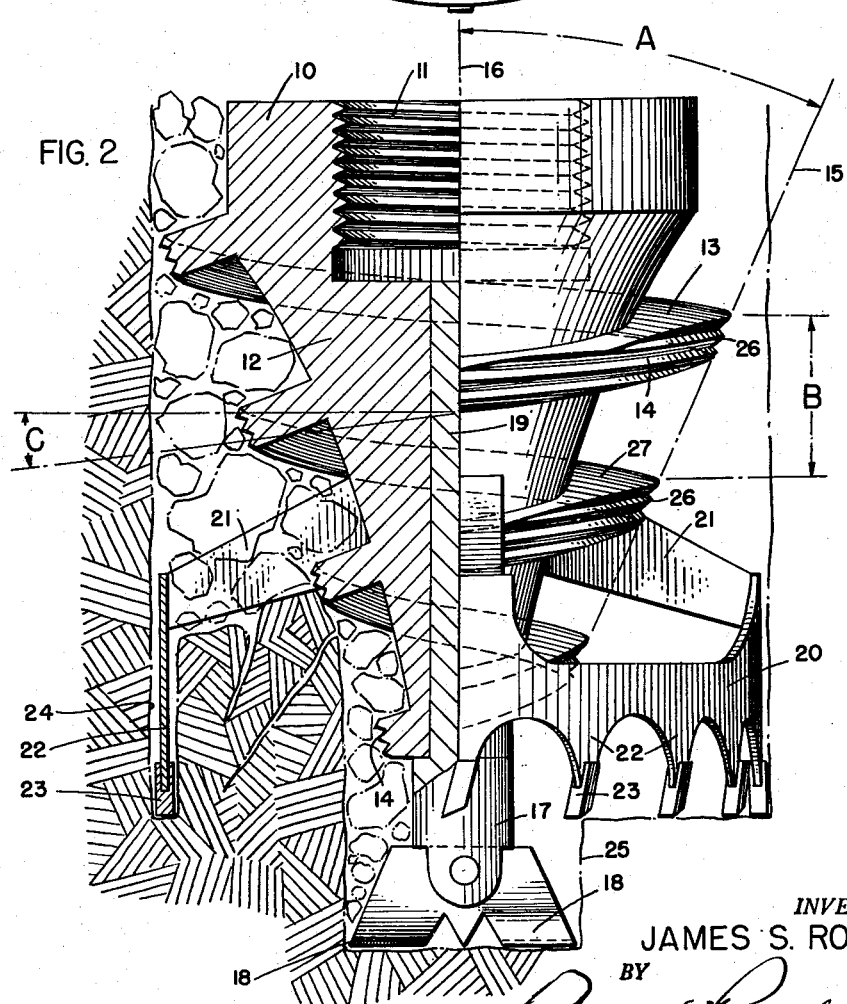
Fig. 2 is a side view of the same, partly in elevation and partly in section on a radial plane.

The pitch of the spiral rib 13 is greater than a pitch that corresponds to the rates of rotation and advance of the drill so that it serves effectively for carrying away the cuttings and rock fragments. The broad rim 14 of this rib has minor screw threads 26 formed thereon of which the pitch corresponds approximately to the rates of rotation and advance of the drill. Thus the broad face 14 of the spiral rib 13 has a radial wedging effect for bursting outwardly the cylindrical core of rock that stands between the bore 25 and the kerf 24. The minor screw threads 26 cut grooves into the side walls of the pilot bore and facilitate the entrance of the rib 13 into the bore while it builds up the lateral pressure that breaks down the core of coal between the bore 25 and the kerf 24, as illustrated at the left of Fig. 2.

It is desirable to continue the rib 13 downwardly along the tapered body portion 12 of the head to a point where the radial distance between its surface 14 and the axis of the drill will be less than the radius of the bore cut by the pilot bit, so that the threads 26 are brought gradually into contact with the side walls of the bore 25; thus bringing these threads into holding engagement with the walls of the bore 25 before the bursting effect of the rim 14 of the spiral rib takes place.

In operation, the drill is driven at constant speed with a substantially constant normal rate of advance by power applying means, not shown; the pilot bit 17 cuts a circular bore and the cutters 23 cut an annular kerf spaced concentrically about this bore; then the advance of the drill causes the conical rib 13 to contact with, and through its rotation, to gradually apply lateral pressure against the walls of the pilot bore until the wedging effect of the spiral surface 14 breaks down the core standing between the pilot bore and the kerf. In the meantime, the minor threads 26 engage the surface of the coal below or inward of the point of travel at which the bursting takes place and thus grip the standing rock and facilitate the progress of the conical thread 13 into position for exerting its bursting effect on the rock core.

The upper surface 27 of the rib 13 serves as a spiral plate conveyor for raising the fragments of broken rock and preventing the same from jamming and obstructing the progress of the drill.

The pitch of the burster threads 13, represented by the distance B in the drawing, has no dependence upon the speed of rotation nor rate of advance of the drill in the rock, but should be such as to provide grooves between threads of adequate conveying capacity for the broken fragments of coal that are produced by the drill's progress. The angle of screw or slope of the surface 27 away from a plane normal to the axis should be not substantially more than forty-five degrees. This slope is indicated by the angle C which is shown in the drawing by lines projected on a plane tangent to the screw and parallel to the plane of the drawing. The angle of screw of the minor threads 26 on the broad rim surface 14 of the spiral rib 13 should approximate the path of a point on its surface traveling at the predetermined rates of rotation and advance of drill. Preferably the angle of screw of these threads should be within five degrees more or less than the estimated path of travel of a point on the periphery of the body 20 of the drill so as to avoid merely reaming the pilot bore.

In a practical specific embodiment of the invention, the diameter of the cutter 20 was 10 inches, the angle A to which the burster surface conforms was 20 degrees, the pitch B was 3 inches, and the angle C was 12 degrees, and the axial breadth of the spiral burster surface 14 was ¾ inches.

Although but one specific embodiment of this invention is herein shown and described, it will be understood that numerous details of the structure shown may be altered or omitted without departing from the spirit of the invention as defined by the following claims.

I claim:

1. A rock drill, comprising a rotary head, a pilot bit positioned to form a bore axially alined with said head, a cutter on said head positioned to cut an annular kerf around and spaced from said bore, a burster formation on said head behind said pilot bit, being in the form of a broad crested conically spiral rib on a central body, said rib being of less diameter at its forward end than said bore, having an axially directed screw conveyor surface and having its crest threaded with spiral convolutions of less pitch than that of said spiral rib.

2. A rock drill, comprising a rotary head, a pilot bit positioned to form a bore axially alined with said head, a cutter on said head positioned to cut an annular kerf around and spaced from said bore, a burster formation on said head behind said pilot bit, being of less diameter at its forward end than said bore and being in the form of a conically spiral rib on a central body, said rib having an axially directed screw conveyor surface of gradually increasing area from the pilot bit rearward and having its crest of substantial axial breadth with a multiplicity of relatively closely spaced spiral convolutions of less pitch than that of said spiral rib.

JAMES S. ROBBINS.

References Cited in the file of this patent

UNITED STATES PATENTS

| Number | Name | Date |
|---|---|---|
| 139,769 | Clark | June 10, 1873 |
| 2,161,000 | Andersen | June 6, 1939 |
| 2,508,230 | Coon | May 16, 1950 |
| 2,562,841 | Compton | July 31, 1951 |